Oct. 18, 1927.
R. E. FREY
FASTENER
Filed April 14, 1926
1,646,285
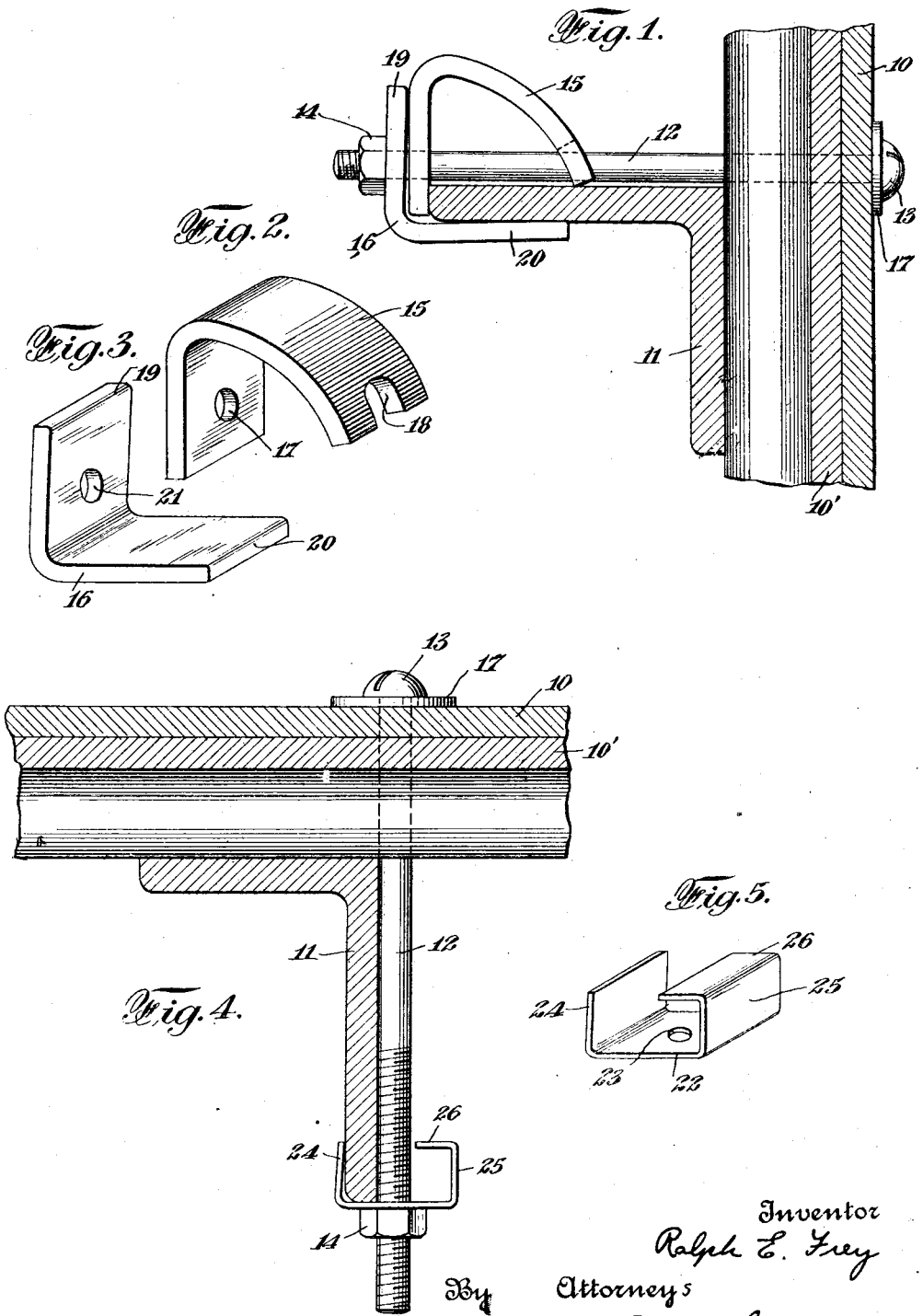

Patented Oct. 18, 1927.

1,646,285

UNITED STATES PATENT OFFICE.

RALPH E. FREY, OF AMBLER, PENNSYLVANIA, ASSIGNOR TO AMBLER ASBESTOS SHINGLE, SLATE AND SHEATHING COMPANY, A CORPORATION OF PENNSYLVANIA.

FASTENER.

Application filed April 14, 1926. Serial No. 101,882.

This invention relates to fastening devices, particularly to a fastening device for corrugated sheets, shingles and the like.

The object of the invention is to provide a simple, inexpensive fastener for securely fastening corrugated sheets or shingles in position.

Further objects and advantages will be apparent by reference to the following specification and drawings, in which Fig. 1 is a vertical sectional view through sheets of corrugated material and a supporting angle iron showing a fastener embodying the invention and a cooperating bolt in operative position;

Fig. 2 is a perspective view of one member of the fastener;

Fig. 3 is a perspective view of the cooperating member of the fastening device;

Fig. 4 is a sectional view of a modification of the invention similar to Fig. 1, and Fig. 5 is a perspective view of the modified fastening device shown in Fig. 4.

In the embodiment of the invention shown in Figs. 1, 2 and 3 sheets 10 and 10' of corrugated material, such as sheet metal or composition material, serving as a roofing, siding or partition are attached to the angle iron 11 by means of a bolt 12 having head 13 and nut 14 on the threaded end cooperating with fastening members 15 and 16. A washer 17 is passed over the bolt under the head where the bolt passes through a hole in the sheet material.

The fastening member 15 is formed from heavy strap or bar iron or steel perforated at 17 at one end to receive the bolt 12. The strap is bent at its central portion to an acute angle with the perforated section forming an extension, with a bifurcation or slot 18 at the extreme end to straddle the bolt 12 when the fastener is in operative position. The cooperating fastening member 16 is bent to slightly less than a right angle at its central portion to form two extensions 19 and 20, one of the extensions 19 being perforated at 21 to receive the bolt 12.

The holes in the sheet material 10 and 10' are so positioned that the bolt 12 passing through will extend across one section of the angle iron 11 of the frame work. The fastening member 15 can slip over the bolt at its threaded end so that its bifurcation 18 straddles the bolt 12 and rests on the surface of the angle iron 11, as shown in Fig. 1. The fastening member 16 is also slipped over the fastener 15 so that the extension 20 overhangs the flange of the angle iron 11. The fastening member 16, before being clamped by nut 14, has the outer ends only of the extensions 19 and 20 contacting with the fastening member 15 and the flange of the angle iron 11. Upon tightening nut 14 the fastening member 16 will be forced against member 15 and the angle iron 11, and the slight spring of the metal under compression of nut 14 will force the surfaces of the extensions 19 and 20 in contact with the surfaces of members 15 and angle iron 11. The clamping and wedging action of the member 16 will tend to draw the bolt 12 toward the surface of the angle iron against its normal tendency to move away from the angle iron, forming a reliable and efficient fastening means. In order to adapt itself to various inclined surfaces and thicknesses of supporting angle irons the fastening device is constructed of two members, one of which is bent at less than a right angle.

In the modification shown in Figs. 4 and 5, a fastener 22 is formed from strap iron or steel perforated at 23 midway of its length to receive the bolt 12. One end 24 is bent at less than a right angle to the central perforated section and the opposite end is bent at a right angle to the central section. A further right angle bend of this section and in the same direction is provided, these two bends forming sections 25 and 26, which are at right angles to each other.

The fastener is slipped over the bolt 12, the section 24 overhanging the flange of the angle iron 11. The sections are so proportioned that before screwing down the nut 14 the section 24 bears against the surface of the overhanging flange of the angle iron only slightly, and at its extreme end in contact with the flange and the section 26 slightly spaced from the bolt 12. Upon tightening of the nut 14 the bolt 12 will tend to move away from the surface of the angle iron but the section 24 will be forced into surface contact with the flange of the angle iron, preventing the drawing away of the bolt from the angle iron. The section 26 at the final stage of tightening will be forced against the bolt 12 due to the spring of the metal and the tendency of the bolt to move away from the angle iron and the nut to force the section 26 toward the bolt against this force.

The fastener can be manufactured from strap material punched and slotted at the same operation, and then bent to the required shape. The construction of the members contacting with the flange of the angle iron at less than a right angle and the flexibility of the material permits the adjustment of the fastener automatically to various thicknesses and inclined surfaces of the flange without the necessity of hammering, and one size of fastener will therefore adjust itself to various sizes of angle irons.

While the invention is illustrated and described more particularly with reference to fastening devices for corrugated sheet material, the invention is not confined thereto but is intended to cover any other uses or modifications within the scope of the appended claims.

I claim:

1. The combination with sheet material and a metal support, of a bolt lying across the surface of said metal support, a fastening member comprising a spring metal strap having a perforated section and a section bent at less than a right angle with the perforated section adapted to automatically conform to the contour of the surface of the metal support with which it contacts upon tightening of the bolt.

2. The combination with sheet material and a metal support, of a bolt lying across the surface of said metal support, a fastening member formed of a section of metal strap said metal strap having a perforated section to permit the bolt to pass therethrough, a section bent at less than a right angle with the perforated section adapted to automatically conform to the contour of one surface of the metal support upon tightening of the bolt, and a section bent at an acute angle to the perforated section for contact with the opposite surface of the metal support upon tightening of the bolt.

3. The combination with sheet material and a metal support, of a bolt lying across the surface of said metal support, a fastening member constructed of separate and cooperating parts, one part formed of a section perforated to permit the bolt to pass therethrough, having a section bent at slightly less than a right angle with the perforated section, and the second separate cooperating part having a section perforated to permit the bolt to pass therethrough, and a section bent at an acute angle to the perforated section having a bifurcation to straddle the bolt so as to permit the end thereof to contact with a surface of the metal support upon the tightening of the bolt.

4. The combination with sheet material and a metal support, of a bolt passing through a hole in the sheet material extending across the face of one flange of the metal support and provided with a nut on its projecting end, a fastener means constructed of two separate sections of spring metal strap, both of which are perforated to permit said bolt to pass therethrough, one of said sections having a portion thereof bent at less than a right angle to its perforated portion extending along the other face of the flange of the metal support, and the opposite section having a portion bent at an acute angle to the perforated portion, having a bifurcation to straddle the bolt, said first mentioned section upon tightening of the bolt being adapted to force the second mentioned section into surface contact with the flange of the metal support and to automatically conform to the contour of the surface of said flange of the metal support.

RALPH E. FREY.